July 15, 1952 W. R. LANGERMAN 2,603,112
CIRCULAR SAW-SETTING DEVICE
Filed Aug. 17, 1951 2 SHEETS—SHEET 1

INVENTOR
WILTON R. LANGERMAN

BY
McMorrow, Berman + Davidson
ATTORNEYS

July 15, 1952  W. R. LANGERMAN  2,603,112
CIRCULAR SAW-SETTING DEVICE
Filed Aug. 17, 1951  2 SHEETS—SHEET 2
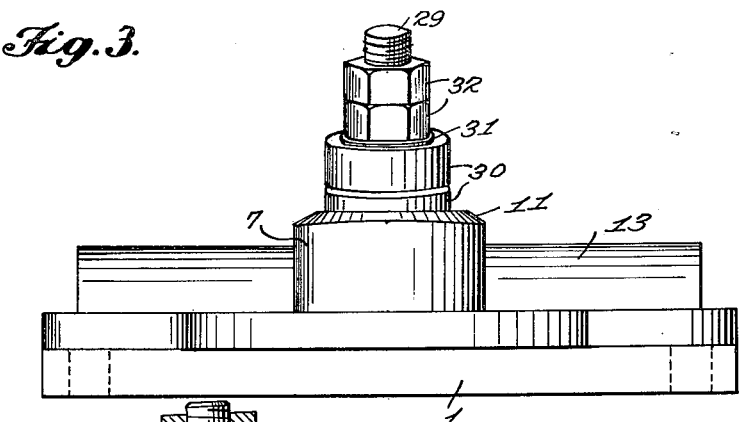
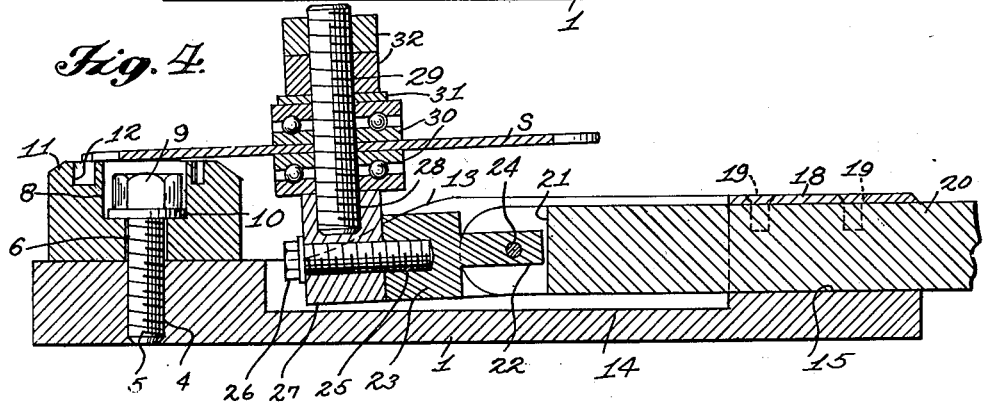
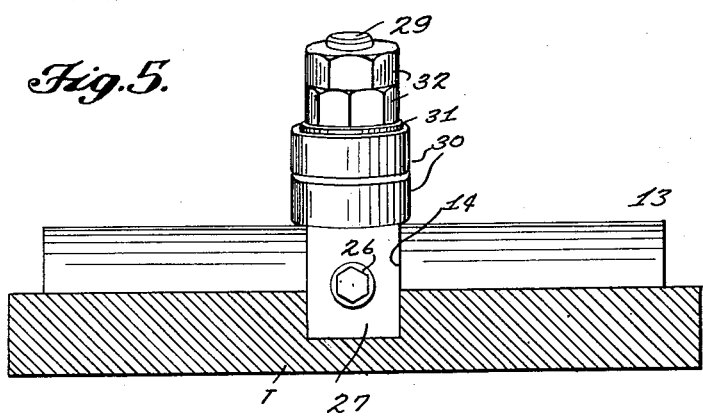
INVENTOR
WILTON R. LANGERMAN
BY
McMorrow, Berman & Davidson
ATTORNEYS Patented July 15, 1952

2,603,112

UNITED STATES PATENT OFFICE 2,603,112

CIRCULAR SAW-SETTING DEVICE

Wilton R. Langerman, Rapid City, S. Dak.

Application August 17, 1951, Serial No. 242,238

4 Claims. (Cl. 76—73)

This invention relates to circular saw setting devices, and more particularly, has reference to that type of saw setting device equipped with an anvil adapted to underlie the periphery of a circular saw blade for hammering of the teeth of the blade to the desired angle of set.

One important object of the present invention is to provide a saw setting device adapted for setting of the teeth of blades of different diameters.

Another important object is to provide a device of the character described novelly adapted for adjustment of the saw blade relative to the anvil through a vertical path.

Another important object is to provide, in a saw setting device, a construction wherein successive adjustments are made, for receiving saw blades of different diameters, tilting the blade to a selected inclined plane, and rotatably adjusting the anvil for setting the teeth to a selected angle, while retaining the anvil in proper alignment relative to the center of the blade.

Still another object is to provide, in a device of the type stated, an anvil novelly formed for allowing the setting of the teeth either by visual observation of the angle to which said teeth should be set, or by positioning a selected surface of the anvil thereunder, if greater accuracy is desired.

Still another object is to provide a saw setting device of compact formation, that will be rugged and durable in use, and will comprise a minimum of parts simply arranged in a manner whereby they will not readily get out of order.

Referring to the drawings:

Figure 3 is a front elevational view.

Figure 4 is a longitudinal sectional view taken on line 4—4 of Figure 1.

Figure 5 is a transverse sectional view taken on line 5—5 of Figure 2.

Figure 1:
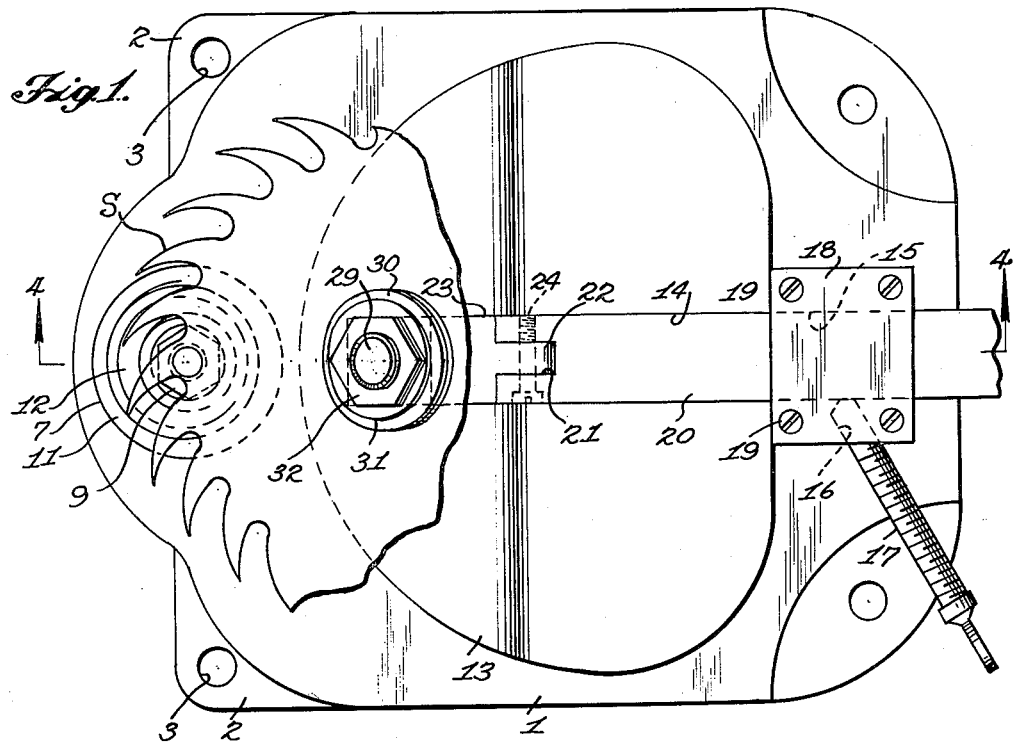
Figure 1 is a top plan view of a saw setting device formed in accordance with the present invention, a portion of a circular saw blade the teeth of which are to be set being illustrated fragmentarily.

Referring to the drawings in detail, the device constituting the present invention includes a wide, generally flat base 1 of solid formation, said base being of approximately rectangular outer configuration and being integral with attaching flanges 2 at the several corners thereof. Openings 3 are formed in the respective flanges, and are adapted to receive bolts or other fastening elements, not shown, whereby the base can be fixedly secured in place upon a work table or the like, also not shown.

Formed in the front end of the base, medially between the opposite sides thereof, is a vertically disposed, threaded opening 4 in which is engaged the upstanding threaded stud 5. The upper portion of the stud projects above the top surface of the base, and extends through a smooth walled opening 6 formed in a circular anvil 7. The opening 6 is arranged concentrically with the periphery of the anvil, and receives the stud 6 sufficiently loosely to permit the anvil to be freely rotated upon the stud through 360°. This allows rotatable adjustment of the anvil about its vertical axis, in a horizontal plane, to selected positions.

Formed in the upper surface of the anvil 7 is a counterbore 8 concentric with and communicating with the opening 6, and threadably engaged with the upper end of the stud 5, within the counterbore, is a lock nut 9, a washer 10 being interposed between said lock nut and the base of the counterbore. Thus, after rotation of the anvil 7 to a selected position of adjustment, the lock nut 9 is threaded downwardly upon the stud, to lock the anvil in the selected position of adjustment. Whenever it is desired to adjust the anvil rotatably to another position, the lock nut is backed off the threads of the stud sufficiently to permit free rotation of the anvil to its new position.

The periphery of the top surface of the anvil is beveled, as at 11. In this connection, as particularly will be seen from Figures 2 and 3, the transverse dimension of the beveled marginal area 11, but not its angle of inclination relative to the axis of rotation of the anvil, is progressively increased from one point upon the circumference of the anvil, to a point diametrically opposite. This allows the setting of teeth of different lengths, it being readily appreciated that the anvil can be rotatably adjusted so that its beveled surface 11 underlies the tooth to be set fully from the point to the base of the tooth, after which a sharp blow upon the tooth will drive it against the beveled surface, so as to set the tooth to the proper angle.

Spaced a short distance inwardly of the beveled marginal area 11 of the anvil is a groove 12 of annular formation. By arranging the inner wall of the groove concentrically with the axis of rotation of the anvil, and disposing the outer wall of the groove eccentrically relative to said axis, there is imparted to the groove the same characteristic possessed by the beveled marginal area, that is, the groove increases in width progressively from one location on its circumference to a location diametrically opposite the first named location.

The purpose of the groove is to allow fast setting of the teeth by visual observation, where the greater accuracy afforded by the beveled marginal area is not of prime importance. In use of the groove, the tooth to be set is disposed over the groove rather than over the marginal surface (see Figure 4), and the tooth is set by its being struck a sharp blow, utilizing a hammer and a punch, not shown.

Figure 2:
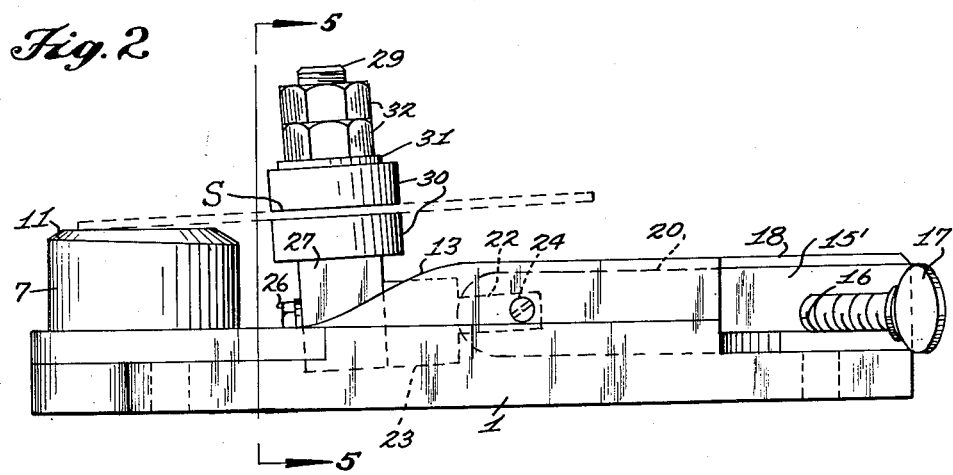
Figure 2 is a side elevational view in which the saw blade has been illustrated in dotted lines.

Intermediate opposite ends of the base 1, there is integrally formed thereupon an elevated table 13, the top surface of which is elevated substantially above the front end surface on which the anvil is rotatable, this construction being best illustrated in Figures 2 and 4. The table 13 has formed therein a channel 14 extended longitudinally and centrally of the base and table, in alignment with the axis of rotation of the anvil, which is disposed forwardly of the front end of said channel.

At its rear end, the channel 14 is in communication with a groove 15 formed in the rear end portion of the base, and aligned longitudinally with the channel. The floor of the groove 15, as seen from Figure 4, is elevated slightly above the floor of the channel.

The groove 15 is defined by the provision of upstanding, transversely spaced walls 15' formed upon the rear end portion of the base, and integral or otherwise made rigid with the base. In one of the walls 15' there is formed a threaded opening 16 disposed obliquely to the groove 15 and communicating at its inner end with said groove. A thumb screw 17 is threadably engaged in the opening 16, for a purpose to be made presently apparent.

Overlying the groove 15 is a cover plate 18, secured fixedly and removably to the respective walls 15' by a plurality of screws 19.

An elongated bar 20 is slidably mounted in the groove 15, and may be adjusted longitudinally of the base 1. Upon adjustment of the bar 20 to a selected position, the thumb screw 17 is threaded thereagainst, to retain the bar fixedly in the selected position of adjustment.

The front end portion of the bar 20 projects into the channel 14 (Figure 4), and is spaced a short distance above the floor or bottom surface of the channel. Said front end portion of the bar 20 is formed with a vertically disposed end slot 21, receiving a tongue 22 formed upon and extending rearwardly from a support block 23, said support block being mounted upon the bar 20 for swinging movement through a vertical plane, through the provision of a pivot bolt 24 extending transversely of the slot and threadably engaged in the front end portion of the bar 20. The tongue 22 has a smooth walled opening receiving a smooth surfaced portion of the shank of the pivot bolt. Thus, the support block 23 is hinged to the bar 20 so that after the setting of one tooth has been accomplished, the blade S can be lifted bodily and rotated for positioning of the next tooth upon the anvil.

Formed in the front surface of the support block 23 is a threaded recess 25, receiving a clamping bolt 26 that extends through a smooth walled opening formed in a base block 27, whereby said base block may be fixedly secured to the support block.

A threaded recess 28 is formed in the top surface of the base block, receiving an upstanding stud 29, that extends through a pair of thrust bearings 30, between which is supported the saw blade S, for free rotation of the saw blade upon the stud. It is believed sufficiently obvious as not to require special illustration that if the center opening of the saw blade S is greater in diameter than the diameter of the stud 29, an adapter washer can be positioned in said center opening, through which the stud 29 would extend.

A washer 31 is positioned upon the stud 29, and overlies the upper bearing 30, said washer being interposed between said upper bearing and a pair of lock nuts 32 threaded upon the upper end portion of the stud.

In use, the lock nuts 32 and the upper bearing 30 are removed from the stud 29, after which a circular saw blade S is positioned upon the lower bearing. The upper bearing and the lock nuts are now returned to place, and the lock nuts are threaded downwardly to mount the saw blade rotatably upon the stud 29 while preventing said saw blade from shifting out of perpendicularity relative to the stud.

The bar 20 is now adjusted longitudinally of the base 1 as necessary, to insure the positioning of the teeth of the saw blade over the groove 12 or beveled surface 11, as desired.

The anvil is now rotatably adjusted so that that portion of the beveled surface or groove, as the case may be, that underlies the teeth is of proper width.

The teeth of the blade are now individually set, and after the setting of each tooth, the blade is rotatably adjusted upon the stud 29. In effecting the rotatable adjustment of the saw blade, the saw blade can be swung bodily upwardly out of the inclined plane illustrated in Figure 4.

What is claimed is:

1. In a device for setting the teeth of a circular saw blade having a center opening, a base; an anvil thereon proportioned to support the peripheral area of said blade and having an annular groove and a beveled marginal area surrounding the groove, said groove and beveled area being each adapted to underlie the teeth of the blade for setting of the teeth against the anvil; a stud aligned with the anvil longitudinally of the base; means connecting the stud to the base for swinging movement and for movement longitudinally of the base toward and away from the anvil, the stud being extendible through said center opening of the blade and constituting means mounting the blade upon the base for rotation and for swinging movement, the movement of said stud longitudinally of the base being effective for selectively locating the peripheral area of the blade in positions in which it overlies the groove and beveled area of the anvil, respectively, said stud constituting means mounting the blade upon the base for rotation and for swinging movement through a vertical plane, the blade being swingable bodily with the stud into and out of engagement with said anvil and being rotatable in any position to which swung, whereby to dispose selected teeth thereof against the anvil; and manually releasable lock means mounted upon the stud and operatively associated with said blade to retain the blade in a position of perpendicularity relative to the stud.

2. A device for setting the teeth of a circular saw blade having a center opening, comprising a base; an anvil mounted thereon and having an annular groove and a beveled marginal area surrounding the groove, said groove and beveled area being each adapted to underlie the peripheral area of a saw blade for setting of the teeth thereof against the anvil; a bar aligned longitudinally with the anvil and slidably mounted on the base for adjustment toward and away from the anvil; an upstanding stud extendible through said center opening in the blade and on which the blade may be rotated, the stud being hinged to the bar for swinging of the blade bodily through a vertical path into and out of engagement with the anvil, the blade being rotatable upon the stud in any position to which the blade is swung and being disposed in a plane inclined slightly from the horizontal when supported upon the anvil, said adjustment of the bar longitudinally of the base being effective for locating the teeth of the blade in selected positions over the groove and beveled surface respectively; and means on the base releasably engaging the bar against movement from selected positions to which the bar is adjusted upon the base.

3. In a device for setting the teeth of a circular saw blade having a center opening, a base having a longitudinal channel extending from an intermediate portion thereof to the rear end thereof, the channel having a downwardly offset bottom surface at its front end; an anvil mounted on the forward end portion of the base and having an annular groove and a beveled marginal area surrounding the groove, said annular groove and beveled area being each adapted to underlie the peripheral area of a saw blade for setting of the teeth thereof against the anvil; a bar aligned longitudinally with the anvil in spaced relation thereto and slidably mounted in said channel for adjustment toward and away from the anvil; an upstanding stud hingedly connected to the front end portion of the bar for swinging movement in a vertical path, the stud being extendible through said center opening of the blade; bearings carried by the stud and supporting the blade rotatably upon the stud, said blade being bodily swingable through said vertical path into and out of engagement with the anvil and being rotatable upon the stud in any position to which the blade is swung, said downwardly offset bottom surface of the channel being adapted to elevate the front end portion of the bar to provide a clearance for swinging movement of said stud, said blade being disposed in a plane inclined slightly from the horizontal, when supported upon the anvil, the adjustment of the bar longitudinally of the base being effective for locating of the teeth of the blade in selected positions over the groove and beveled surface respectively; and means on the base releasably engageable with the bar to hold the bar against movement from selected positions to which the bar is adjusted upon the base.

4. In a device for setting the teeth of a circular saw blade, a base; an anvil mounted on the base for rotation through three hundred and sixty degrees and having an annular groove and a beveled marginal area surrounding the groove, said annular groove and beveled area being each adapted to underlie the peripheral area of a saw blade for setting of the teeth thereof against the anvil, said groove and beveled surface being each of a width increasing progressively from one location on the circumference thereof to a diametrically opposite location; a bar aligned longitudinally with the anvil and slidably mounted on the base for adjustment toward and away from the anvil; a stud upstanding from and hingedly connected to the bar for swinging movement through a vertical path, said stud being extendible through a center opening of the blade for rotatable mounting of the blade upon the stud, said stud being adapted for swinging of the blade bodily through a vertical path into and out of engagement with the anvil, the blade being rotatable upon the stud in any position to which it is swung, the adjustment of the bar longitudinally of the base being effective for locating the teeth of the blade in selected positions over the groove and beveled surface respectively; and means on the base releasably engaging the bar against movement from selected positions to which the bar is adjusted upon the base.

WILTON R. LANGERMAN.

REFERENCES CITED

The following references are of record in the file of this patent:

UNITED STATES PATENTS

| Number | Name | Date |
| --- | --- | --- |
| 387,337 | Beardsley et al. | Aug. 7, 1888 |
| 471,641 | Ivey | Mar. 29, 1892 |
| 577,559 | Morrill | Feb. 23, 1897 |
| 622,086 | Sicotte | Mar. 28, 1899 |
| 1,117,595 | Oatley | Nov. 17, 1914 |
| 1,263,191 | Benner | Apr. 16, 1918 |